United States Patent [19]

Wivagg

[11] Patent Number: 5,781,603
[45] Date of Patent: Jul. 14, 1998

[54] METHOD AND APPARATUS FOR REPAIR OF NUCLEAR REACTOR SHROUD

[75] Inventor: Adrian Peter Wivagg, Tolland, Conn.

[73] Assignee: Combustion Engineering, Inc., Windsor, Conn.

[21] Appl. No.: 785,023

[22] Filed: Jan. 17, 1997

Related U.S. Application Data

[63] Continuation of Ser. No. 505,785, Jul. 21, 1995, Pat. No. 5,623,526.

[51] Int. Cl.$^6$ .............................. G21C 9/00; B23P 15/26
[52] U.S. Cl. .......................... 376/260; 376/293; 376/302; 376/461; 29/402.01; 29/890.031
[58] Field of Search .................. 376/260, 287, 376/293, 302, 461; 29/402.01, 402.15, 890.031

[56] References Cited

U.S. PATENT DOCUMENTS

| | | | |
|---|---|---|---|
| 5,065,490 | 11/1991 | Wivagg et al. | 29/402.01 X |
| 5,402,570 | 4/1995 | Weems et al. | 29/830.031 |
| 5,430,779 | 7/1995 | Baversten et al. | 376/287 |
| 5,488,643 | 1/1996 | Baversten | 376/461 X |
| 5,530,219 | 6/1996 | Offer et al. | 29/890.031 X |
| 5,623,526 | 4/1997 | Wivagg | 376/260 X |

FOREIGN PATENT DOCUMENTS

| | | | |
|---|---|---|---|
| 08-122485 | 5/1996 | Japan | 376/260 |
| 08-233971 | 9/1996 | Japan | 376/260 |
| 08-278390 | 10/1996 | Japan | 376/260 |

OTHER PUBLICATIONS

Patent Abstracts of Japan (English Translations), JP-08-122485, JP-08-233971, JP-08-278390, 1996 JPO.

*Primary Examiner*—Charles T. Jordan
*Assistant Examiner*—Matthew J. Lattig
*Attorney, Agent, or Firm*—Ronald P. Kananen; John H. Mulholland

[57] ABSTRACT

In order to support a shroud against bending, shear, stress and torsion, straps which are preferably formed of the same material as the shroud, are placed in strategic positions with respect to cracks or the like type of weaknesses which have been detected, and fastened in place using a suitable fastening technique. In the preferred embodiments of the invention holes are formed using an EDM technique and bolt units which have an expanding portion are inserted into the holes, torqued and expanded in a manner which fastens the strap to the shroud. Welding and the like type of fastening techniques are not excluded and may used alternatively or in combination with the bolting technique as required.

27 Claims, 6 Drawing Sheets

METHOD AND APPARATUS FOR REPAIR OF NUCLEAR REACTOR SHROUD

This application is a continuation of application Ser. No. 08/505,785 filed Jul. 21, 1995 now U.S. Pat. No. 5,623,526.

BACKGROUND OF THE INVENTION

1. Field of the Invention

The present invention relates generally to nuclear reactors. More specifically, the present invention relates to a technique which enables the repair and/or reinforcement of shrouds which have developed cracks or the like types of faults.

2. Brief Description of the Related Art

Nuclear reactors such as a boiling water type (BWR) 10 shown in FIG. 1, enclose a plurality of spaced fuel rods, generally denoted by the numeral 12, within a shroud 14 which is supported within the reactor pressure vessel (RPV) 16. The shroud 12 locates on the core support plate 20 and the top guide 32. It also supports a separator arrangement 22 and maintains a volume of water over the fuel 12. In this arrangement, a plurality of control rods 18 are disposed below the fuel rods 12 and are arranged to move up through the core support plate 20 into position to control the combustion of the nuclear fuel. The separator arrangement 22 is located on top of the shroud 22, while a dryer 24 is arranged at a still higher level and essentially opposite a main steam line 26. A pressure vessel head 28 is secured to the upper flange of the reactor pressure vessel in a manner which hermetically seals off the top of the RPV 16.

As shown in FIG. 2, the shroud 14 is constructed of a number of cylindrical and/or annular sections which are welded together. In the shroud shown in FIG. 2, only seven (H1 to H7) of the welds, which form essential parts of the shroud structure, are shown. However, it is possible that, due to intergrannular stress corrosion cracking (IGSCC) and other metallurgical phenomenon, cracks can develop in the shroud, particularly at the sites of the welds, and lead to a situation wherein portions of the shroud can separate in an undesirable manner which may interfere with the proper operation of the reactor.

Repair of such types of cracks is of course difficult and usually requires the fuel (fuel rods 12) to be offloaded and the repair carried out with the fuel stored in a separate holding pool. However, as will be appreciated, in order for the fuel rods 12 to be released, lifted out of the reactor vessel and immersed in a holding tank, all of the apparatus which is disposed in the reactor above the fuel rods must first be removed and placed in holding tanks. Accordingly, the number of operations which must be carried out before the actual repair work can actually begin is substantial and the length of the outage of the reactor is prolonged considerably. Even in the case of relatively minor cracks, the above-mentioned troublesome removal of the dryer 24, the shroud head and separator arrangement 22, and the fuel rods 12 must be carried out before repair operations can be initiated, irrespective of the fact that the repair operation itself may be relatively simple and quickly carried out.

SUMMARY OF THE INVENTION

It is an object of the present invention to provide a technique which enables the repair of the shroud without the need to remove the fuel from the reactor.

It is a further object of the invention to provide a simple apparatus which can be used to fortify or repair a nuclear reactor shroud while the fuel is still in the reactor pressure vessel.

It is yet another object of the invention to provide a repair technique which involves the use of straps which are fastened to the external surface of the shroud in a manner which supports the shroud against bending forces, shearing forces, and torsion forces.

In brief, the above mentioned objects and others are achieved by an arrangement wherein straps, which are formed of the same material as the shroud, are placed in strategic positions with respect to cracks or the like types of weaknesses which have been detected in the shroud, and fastened in place using a suitable fastening technique. In the preferred embodiments of the invention, holes are formed using an EDM technique and bolt units which have an expanding portion are inserted into the holes, torqued and expanded in a manner which fastens the strap to the shroud. Welding and the like type of fastening techniques are not excluded and may be used alternatively or in combination with the bolting technique as required.

The length of the straps is variable and can be selectively varied so that a suitable number of welds are spanned and the required amount of support is provided. A plurality of straps can be used. The number of straps varies with the problem that needs solving. The separation or interval between the straps need not be uniform. For example, if four straps are used they need not necessarily be arranged uniformly at 90 degree intervals. In the event that a number of straps are used, the length of each strap can be varied as necessary under the instant set of conditions and the degree of support that is required to ensure that the shroud exhibits the desired degree of structural strength for horizontal, vertical and lateral welds.

While it is preferable that the straps be made of the same material as the shroud, a different material can be used as long as the material is such as to not introduce corrosion or undergo thermal or radiation induced changes which endangers the support which is intended to be provided by the straps.

Electron discharge machining (EDM) is used in connection with the preferred embodiments for removing metal and cutting holes and the like. This technique is favored in that tooling loads during cutting are negligible and chips and the like type of debris is not formed or, alternatively, is easily collected.

The combination of the straps with other support structure is not excluded from the scope of the invention. This support structure can be arranged to be disposed either internally or externally of the shroud. For example, U.S. Pat. No. 5,430,779 to Baversten et al. issued on Jul. 4, 1995, and co-pending U.S. patent application Ser. No. 08/241,441 filed on May 11, 1994 in the name of Baversten, could be referred to for teachings pertaining to support structures which could be used in connection with the present invention. The disclosures of these two documents are hereby incorporated by reference.

More specifically, a first aspect of the present invention resides in a nuclear reactor having an essentially cylindrically-shaped shroud formed of a plurality of annular segments which are welded to one another and which features: a strap which extends essentially parallel to an axis of said cylindrically-shaped shroud and which is securely fastened to an external surface of the shroud, said strap being arranged to span at least one of the welds of said shroud, said strap withstanding bending, shearing and tension forces which are applied to said shroud.

A second aspect of the present invention resides in a method of repairing an essentially cylindrically-shaped shroud formed of a plurality of annular segments which are welded to one another, comprising the steps of: placing a strap against a predetermined portion of an external surface of the shroud wherein the strap spans at least one of the welds which secure the segments of the shroud together; forming a plurality of holes through the strap and the shroud; disposing fastening means through the plurality of holes to fasten the strap to the shroud and to render the strap integral with the shroud.

A third aspect of the invention resides in a method of repairing a nuclear reactor which includes a plurality of fuel rods and a shroud which is disposed about the fuel rods, comprising the steps of: placing a strap against the external surface of a nuclear reactor shroud so as to span at least one weld formed in the shroud; and securing the strap to the shroud using fastening means.

Another feature of the strap allows the fabrication of EDM support fasteners. The EDM operation is shortened through the use of the prelocated tooling positions.

The strap is a long flat structure which may have a channel, H beam or other cross-sectional shape which develops the required strength.

BRIEF DESCRIPTION OF THE DRAWINGS

The present invention will become more clearly appreciated as a description of the preferred embodiment is made with reference to the appended drawings in which.

DETAILED DESCRIPTION OF THE PREFERRED EMBODIMENTS

Figure 1:
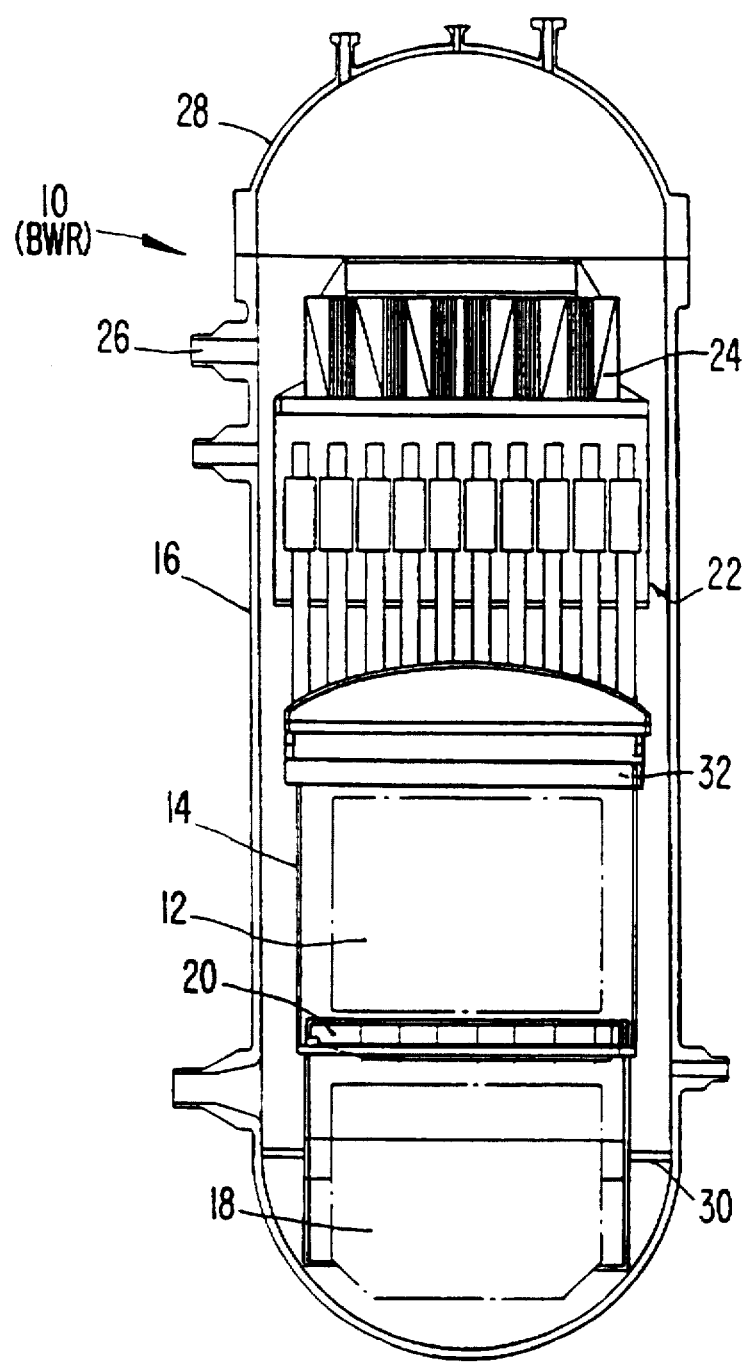
FIG. 1 is a cut-away view showing the interior of a BWR of the type discussed in the opening paragraphs of the disclosure.
Figure 2:
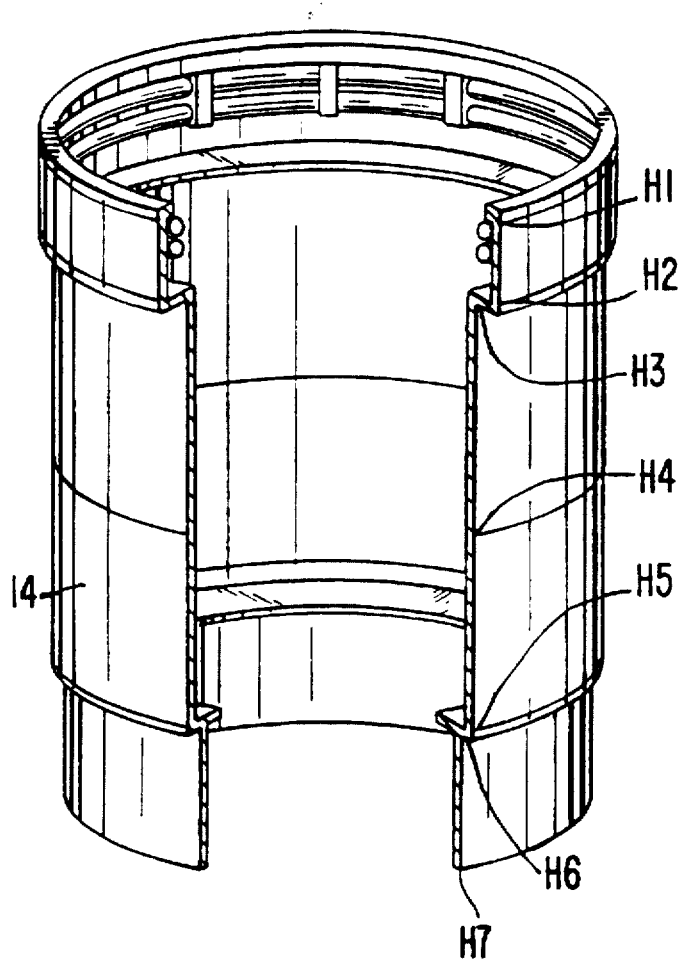
FIG. 2 is a perspective, partially cut-away view of a shroud which is used in the BWR shown in FIG. 1, and which shows typical welds which are included in its construction.
Figure 3:
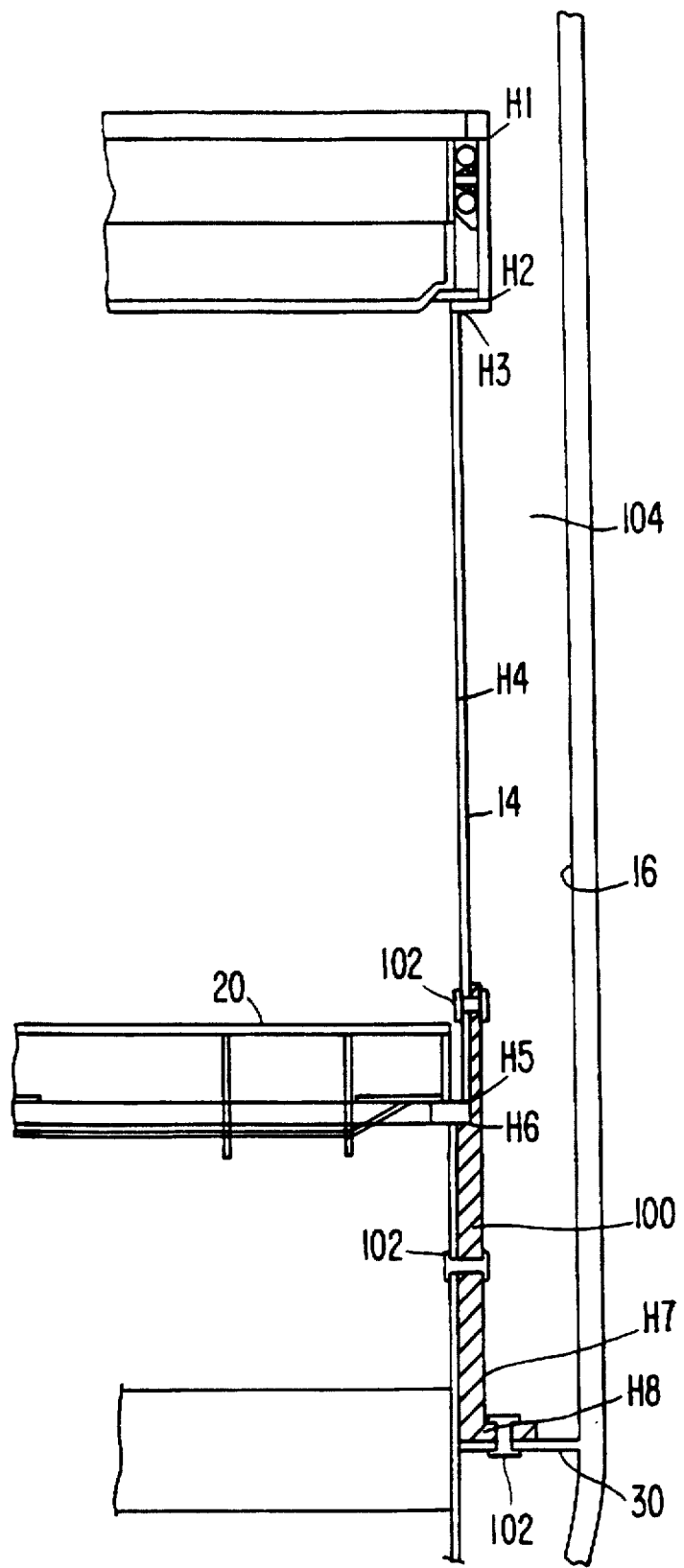
FIG. 3 is a vertical section showing a strap arrangement according to a first embodiment of the present invention.
Figure 4:
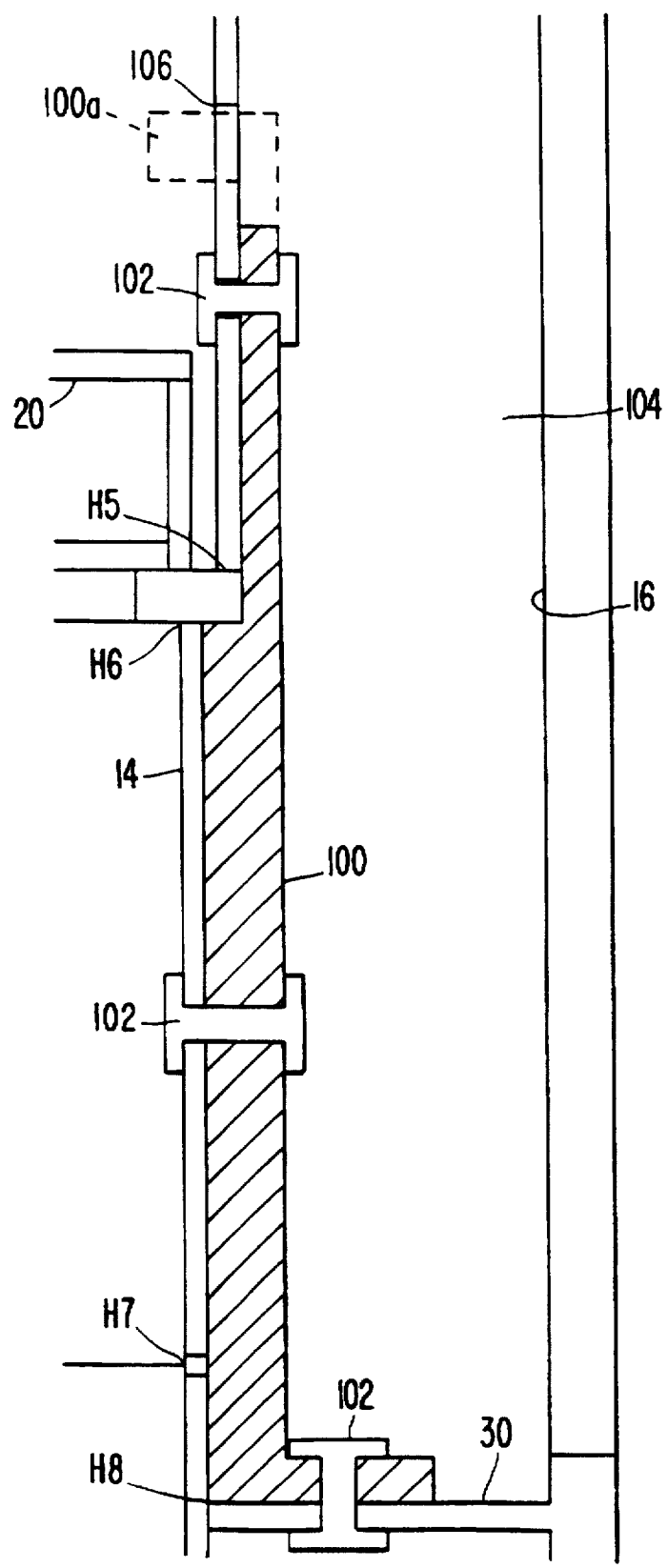
FIG. 4 is an enlarged view of the strap shown in FIG. 3 depicting the use of "P-bolts" which are used to fasten the strap in place against the exterior of the shroud.

FIGS. 3 and 4 show a first embodiment of the invention. In this arrangement, straps 100 which are made of the same material as the shroud 14, or example stainless steel 304, are, in this embodiment, fastened to the shroud using so called "P-bolts" 102. While it is to be specifically noted that the invention is not limited to the use of these so called "P-bolts", this particular type of fastening technique is preferred in connection with this embodiment. With the illustrated straps, the H5 to H8 welds are spanned or covered. A plurality of straps 100, for example four or more straps, can be used; however, they need not necessarily be uniformly arranged at 90 degree intervals and the spacing is determined on a case-by-case basis depending on the reinforcement which is required and the space which is available.

Prior to being submerged, each strap 100 is mounted on a delivery fixture and fitted with three (by way of example only) EDM heads (not shown) which are positioned at the sites where the "P-bolt" connections are required. Each of the straps is then lowered down through the annulus 104 defined between the shroud 14 and inner wall of the pressure vessel 16, using a so called "rigid pole" system. When each of the straps 100 is maneuvered into the desired position, the EDM tool heads cut the appropriately shaped holes through the wall of the shroud. The EDM heads are then remotely released and removed while the strap is maintained in position. The "P-bolts" 102 are then lowered into position, slid into the strap, threaded in and expanded. Each "P-bolt" 102 is then crimped to lock it in place. In the illustrated embodiment, the strap has an L-shape and the lower end or foot 100f fastened to a shroud support plate 30.

The EDM process is carried out in a manner wherein the tooling loads are negligible and no chips are produced during each cut. The fines which are produced during the cutting operation are flushed out by water which is directed through the electrode by flushing pumps which take suction on the shroud and pass the water through filters. The filters in this instance are 0.8 micron and capture 99.9% of the fines in the water which is pumped through the area of the EDM electrodes.

An alternative to the above "pre-mounting" technique resides in the strap being placed in position and the EDM cutting tools, which are supported at the ends of a delivery mast, then delivered into position in the annulus between the shroud and the pressure vessel using the above mentioned rigid pole system. Tool fixtures including alignment features and positioning clamps can be used to secure the mast and the tool head at the proper location for the respective cuts.

It will be noted that the shroud 14, to which the strap according to the first embodiment of the invention is applied, has eight welds Hi to H8; and that the strap 100 illustrated in FIG. 3 is such as to span welds H5 to H8. This strap is able to withstand bend, and shear in addition to tension, and thus, when fastened to the shroud in the illustrated position, is able to securely support the shroud against bending and shearing forces as well as tension, and thus can be expected to increase the strength and resistance of the shroud to forces produced by seismic activity and the like for both horizontal and vertical welds.

For further disclosure pertaining to the above mentioned "P-bolts", reference may be had to U.S. Pat. No. 5,065,490 issued to Wivagg et al. on Nov. 19, 1991. The disclosure of this patent is hereby incorporated by reference.

It will be noted that FIG. 4 shows a variant of the first embodiment. That is to say, in this figure, an opening 106 is formed in the shroud 14 immediately above the top of the strap 100 and a flange section 100a is formed at the upper end of the illustrated strap 100. The flange 100a is arranged to project through the hole 106 into the interior of the shroud 14 where it can be connected to an internal tie rod or the like type of structure.

Figure 5:
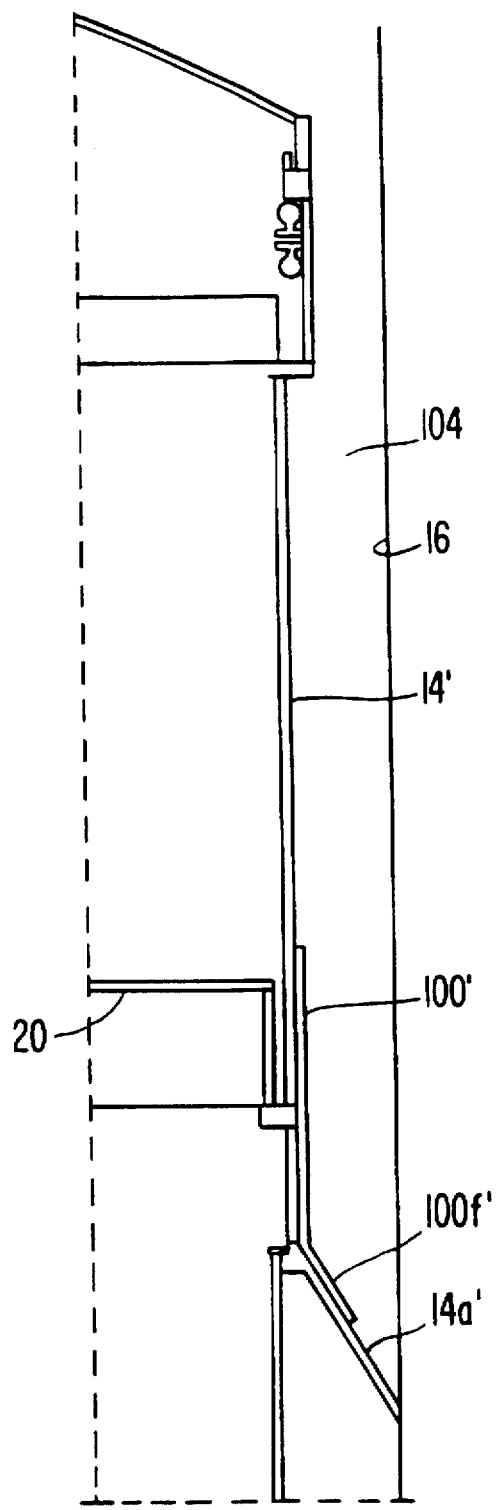
FIG. 5 is an elevation view showing a strap arrangement according to a second embodiment of the invention.
Figure 6:
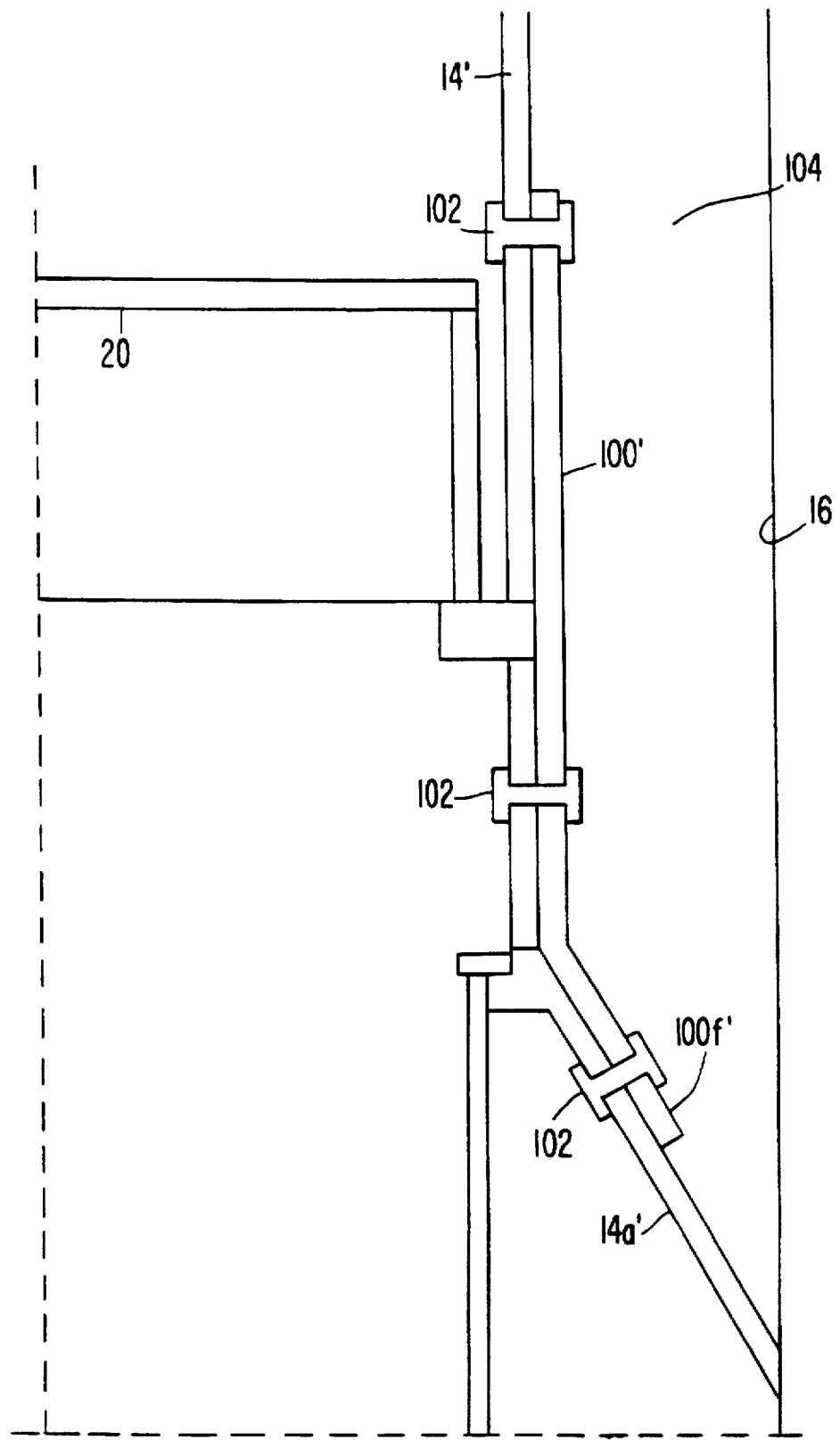
FIG. 6 is an enlarged view of a strap according to second embodiment.

FIGS. 5 and 6 show a second embodiment of the invention. This embodiment features a strap 100' which has an angled foot section 100f' and which is adapted for use with a shroud having an essentially frusto-conically shaped skirt portion 14a'. This embodiment is essentially similar to the first with this latter mentioned exception.

FIG. 6 shows the strap of Fig. 5 in enlarged form. In this drawing the use of "P-bolt" type fasteners is shown.

It will be noted that the length of the straps shown in FIGS. 3 to 6 is not limited to that shown in the drawings and can be of any suitable length. For example, it is clearly within the scope of the invention to make the straps long enough as to extend along a substantial portion of the height of the shroud and to span welds H4 to H8 for example.

It will be further noted that the upper ends of the straps can be formed with outwardly extending flanges which are adapted to be connected to an external support structure such as a tie rod or the like, and thus cooperate with this additional structure in a manner which will extend the supportive effect of the straps over the full length of the shroud. Alternatively, a hole can be formed in the shroud which allows an inwardly extending flange to be fitted through the hole and to be connected to an internally disposed support structure. As will be appreciated, in the event that a hole is formed in the shroud for the purposes of allowing a flange or projection to pass through into the interior of the shroud, the hole and the projection member should have very similar dimensions so that a relatively snug fit is achieved and the amount of water which can flow through any remaining gaps is minimized to the maximum possible degree.

Although the present invention has been described with reference to only two basic embodiments, it will be appreciated that a number of variations and modification are possible without departing from the scope of the invention and that the scope of the invention is determined only by the appended claims.

What is claimed is:

1. A repair apparatus for a nuclear reactor having an essentially cylindrically-shaped shroud formed of a plurality of annular segments which are welded to one another comprising:

an elongate strap which is longer than it is wide, which extends essentially parallel to a central longitudinal axis of said cylindrically-shaped shroud, and which is securely fastened at least at its both ends by fastening means to an external surface of the shroud, said strap being arranged to span at least two welds which interconnect the annular segments of said shroud, said strap withstanding bending, shearing and tension forces which are applied to said shroud.

2. A method of repairing an essentially cylindrically-shaped shroud formed of a plurality of annular segments which are welded to one another, comprising the steps of:

placing a strap which is of a one-piece construction, is free of welds and joints, and is longer than it is wide, against a predetermined portion of an external surface of the shroud wherein the strap extends essentially parallel to a central longitudinal axis of said cylindrically-shaped shroud and spans at least one of the welds which secure the segments of the shroud together; and forming a plurality of holes through at least one of the strap and the shroud while the strap is placed against the predetermined portion of the shroud external surface; and disposing fastening means through the plurality of holes to fasten the strap to the shroud and to render the strap integral with the shroud.

3. An apparatus for repairing an essentially cylindrically-shaped shroud formed of a plurality of annular segments which are welded to one another, comprising:

means for placing a strap which is longer than it is wide against a predetermined portion of an external surface of the shroud wherein the strap extends essentially parallel to a central longitudinal axis of said cylindrically-shaped shroud and spans at least one of the welds which secure the segments of said shroud together;

means for forming a plurality of holes through the strap and the shroud; and means for disposing fastening means through said plurality of holes to fasten said strap to said shroud and to render said strap integral with the shroud.

4. A repair apparatus as set forth in claim 1, wherein said strap is of a single piece construction and is free of welds and joints.

5. An apparatus as set forth in claim 1, wherein said strap has an outwardly angled portion which engages with and is connected to a member which extends between the shroud and an inner wall of a pressure vessel in which the shroud is disposed.

6. An apparatus as set forth in claim 5, wherein the member is an essentially frusto-conically-shaped skirt portion which extends outwardly from a lower portion of the shroud.

7. An apparatus as set forth in claim 5, wherein the member is a shroud support plate which is rigid with the reactor pressure vessel and which extends radially inward from an inner wall of the reactor vessel to said shroud.

8. An apparatus as set forth in claim 1, wherein said strap is formed with a flange section at its upper end, said flange section being adapted to extend radially inwardly with respect to a main portion of said strap and to extend through an aperture formed in the shroud.

9. An apparatus as set forth in claim 1, wherein said strap is disposed radially outward of a core support plate which is disposed in a lower portion of the shroud.

10. A method as set forth in claim 2, further comprising the step of connecting a lower portion of the strap to a member which extends between the shroud and an inner wall of a reactor pressure vessel in which the shroud is disposed.

11. A method as set forth in claim 10, wherein the member is an essentially frusto-conically-shaped skirt portion which extends outwardly from a lower portion of the shroud.

12. A method as set forth in claim 10, wherein the member is a shroud support plate which is rigid with the reactor pressure vessel and which extends radially inward from an inner wall of the reactor vessel to the shroud.

13. A method as set forth in claim 2, further comprising the step of forming an upper end of the strap with an inwardly extending flange and forming a hole in the shroud through which the inwardly extending flange can extend.

14. A method as set forth in claim 2, further comprising the step of locating the strap against a lower portion of the shroud so as to be radially outward of a core support plate which is disposed in a lower portion of the shroud.

15. A method as set forth in claim 2, wherein the step of disposing includes disposing the fastening means into the plurality of holes from outside of the shroud so that the fastening means pass through the holes in the strap before entering the holes in the shroud.

16. An apparatus for repairing a nuclear reactor having an essentially cylindrically-shaped shroud which is formed of a plurality of annular segments which are welded to one another, and which is disposed within a reactor pressure vessel, comprising:

a strap which is longer than it is wide and which is placed against a lower predetermined portion of an external surface of the shroud so that said strap extends essentially parallel to a central longitudinal axis of said cylindrically-shaped shroud and spans a plurality of welds which secure the segments of said shroud together; and a plurality of holes formed through at least one of the strap and the shroud while the strap is placed against the predetermined portion of the shroud external surface; and fastening means disposed through said plurality of holes to fasten said strap to said shroud and to render said strap integral with the shroud.

17. An apparatus as set forth in claim 16, wherein said strap has an outwardly angled portion which engages with and is connected to a member which extends between the shroud and an inner wall of a pressure vessel in which the shroud is disposed.

18. An apparatus as set forth in claim 17, wherein the member is an essentially frusto-conically-shaped skirt portion which extends outwardly from a lower portion of the shroud.

19. An apparatus as set forth in claim 17, wherein the member is a shroud support plate which is rigid with the reactor pressure vessel and which extends radially inward from an inner wall of the reactor vessel to said shroud.

20. An apparatus as set forth in claim 16, wherein said strap is formed with a flange section at its upper end, said flange section being adapted to extend radially inwardly with respect to a main portion of said strap and to extend through an aperture formed the shroud.

21. An apparatus as set forth in claim 16, wherein said strap is disposed radially outward of a core support plate which is disposed in a lower portion of the shroud.

22. A method of repairing an essentially cylindrically-shaped shroud formed of a plurality of annular segments which are welded to one another, comprising the steps of:

placing a strap which is of a one-piece construction, is free of welds and joints, and is longer than it is wide, against a predetermined portion of an external surface of the shroud wherein the strap spans at least one of the welds which secure the segments of the shroud together;

forming a plurality of holes through at least one of the strap and the shroud while the strap is placed against the predetermined portion of the shroud external surface; and disposing fastening means through the plurality of holes to fasten the strap to the shroud and to render the strap integral with the shroud; and connecting a lower portion of the strap to a member which extends between the shroud and an inner wall of a reactor pressure vessel in which the shroud is disposed.

23. A method as set forth in claim 22, wherein the member is an essentially frusto-conically shaped skirt portion which extends outwardly from a lower portion of the shroud.

24. A method as set forth in claim 22, wherein the member is a shroud support plate which is rigid with the reactor pressure vessel and which extends radially inward from an inner wall of the reactor vessel to the shroud.

25. An apparatus for repairing a nuclear reactor having an essentially cylindrically-shaped shroud which is formed of a plurality of annular segments which are welded to one another, and which is disposed within a reactor pressure vessel, comprising:

a strap which is longer than it is wide and which is placed against a lower predetermined portion of an external surface of the shroud so that said strap spans a plurality of welds which secure the segments of said shroud together, said strap having an outwardly angled portion which engages with and is connected to a member which extends between the shroud and an inner wall of a pressure vessel in which the shroud is disposed;

a plurality of holes formed through at least one of the strap and the shroud while the strap is placed against the predetermined portion of the shroud external surface; and fastening means disposed through said plurality of holes to fasten said strap to said shroud and to render said strap integral with the shroud.

26. An apparatus as set forth in claim 25, wherein the member is an essentially frusto-conically shaped skirt portion which extends outwardly from a lower portion of the shroud.

27. An apparatus as set forth in claim 25, wherein the member is a shroud support plate which is rigid with the reactor pressure vessel and which extends radially inward from an inner wall of the reactor vessel to said shroud.

* * * * *